(12) United States Patent
Chen et al.

(10) Patent No.: US 8,100,553 B2
(45) Date of Patent: Jan. 24, 2012

(54) LED ILLUMINATION MODULE WITH LARGE LIGHT EMITTING ANGLE

(75) Inventors: Chin-Chung Chen, Taipei Hsien (TW); Hai-Wei Zhang, Shenzhen (CN); Ci-Jin Mo, Shenzhen (CN)

(73) Assignees: Fu Zhun Precision Industry (Shen Zhen) Co., Ltd., Shenzhen, Guangdong Province (CN); Foxconn Technology Co., Ltd., Tu-Cheng, New Taipei (TW)

( * ) Notice: Subject to any disclaimer, the term of this patent is extended or adjusted under 35 U.S.C. 154(b) by 372 days.

(21) Appl. No.: 12/558,601

(22) Filed: Sep. 14, 2009

(65) Prior Publication Data

US 2011/0019401 A1    Jan. 27, 2011

(30) Foreign Application Priority Data

Jul. 21, 2009   (CN) .......................... 2009 1 0304574

(51) Int. Cl.
*F21V 1/00*    (2006.01)
*F21V 11/00*   (2006.01)
*F21V 5/04*    (2006.01)

(52) U.S. Cl. .................. 362/240; 362/244; 362/249.02; 362/249.06; 362/311.02; 362/311.14

(58) Field of Classification Search .................. 362/235, 362/240, 244, 249.02, 249.06, 311.02, 311.14, 362/800
See application file for complete search history.

(56) References Cited

U.S. PATENT DOCUMENTS

| 6,250,774  | B1 * | 6/2001  | Begemann et al. ........... 362/231 |
| 7,665,862  | B2 * | 2/2010  | Villard ...................... 362/249.02 |
| 8,047,680  | B2 * | 11/2011 | Huang et al. .............. 362/249.02 |
| 2005/0174769 | A1 * | 8/2005  | Yong et al. .................... 362/235 |
| 2009/0185374 | A1 * | 7/2009  | Wu et al. .................. 362/249.06 |

* cited by examiner

*Primary Examiner* — Stephen F Husar
*Assistant Examiner* — James Cranson, Jr.
(74) *Attorney, Agent, or Firm* — Altis Law Group, Inc.

(57) ABSTRACT

An LED illumination module comprises a plurality of supporters each comprising a bottom plate and a lateral plate extending upwardly and slantwise from the bottom plate, an LED mounted on an outer surface of each of the lateral plates of the supporters, and a lens covering the LED. An inclined angle θ of the lateral plate relative to the bottom plate and a light emitting angle φ of the LED adjusted by the lens covering thereon meet a formula: θ+φ>90°.

19 Claims, 9 Drawing Sheets

LED ILLUMINATION MODULE WITH LARGE LIGHT EMITTING ANGLE

BACKGROUND

1. Technical Field

The disclosure relates to illumination devices and, particularly, to an LED (light emitting diode) illumination module with a large light emitting angle.

2. Description of Related Art

LED illumination devices have been quickly developed in recent years. Compared with traditional illumination devices, the advantages of the LED illumination devices are small volume, short response time, long life, low driving voltage and better anti-shock capability. Traditionally, the LED illumination device is manufactured through two general optical design processes to form primary and secondary optical systems. The primary optical system generally refers to a transparent resin package covering an LED chip. The primary optical system functions to efficiently extract light out of the LED chip by controlling a distribution of luminous intensity of the emitted light. The secondary optical system is generally constructed by lenses, reflectors, or other optical structures, to optimize the distribution of luminous intensity of the light emitted from the primary optical system.

A light emitting angle of a traditional LED illumination device is less than 120°. Nevertheless, when an LED illumination device is applied in an indoor parking lot, an underpass, a mine or the like sites, it is required to have a three-dimensional illumination effect. Unfortunately, the traditional LED illumination device having a small light emitting angle can not meet the requirement of large-angled illumination.

What is needed, therefore, is an LED illumination module with a large light emitting angle which can overcome the described limitations.

BRIEF DESCRIPTION OF THE DRAWINGS

Many aspects of the present apparatus can be better understood with reference to the following drawings. The components in the drawings are not necessarily drawn to scale, the emphasis instead being placed upon clearly illustrating the principles of the present apparatus. Moreover, in the drawings, like reference numerals designate corresponding parts throughout the several views.

DETAILED DESCRIPTION

Figure 1:
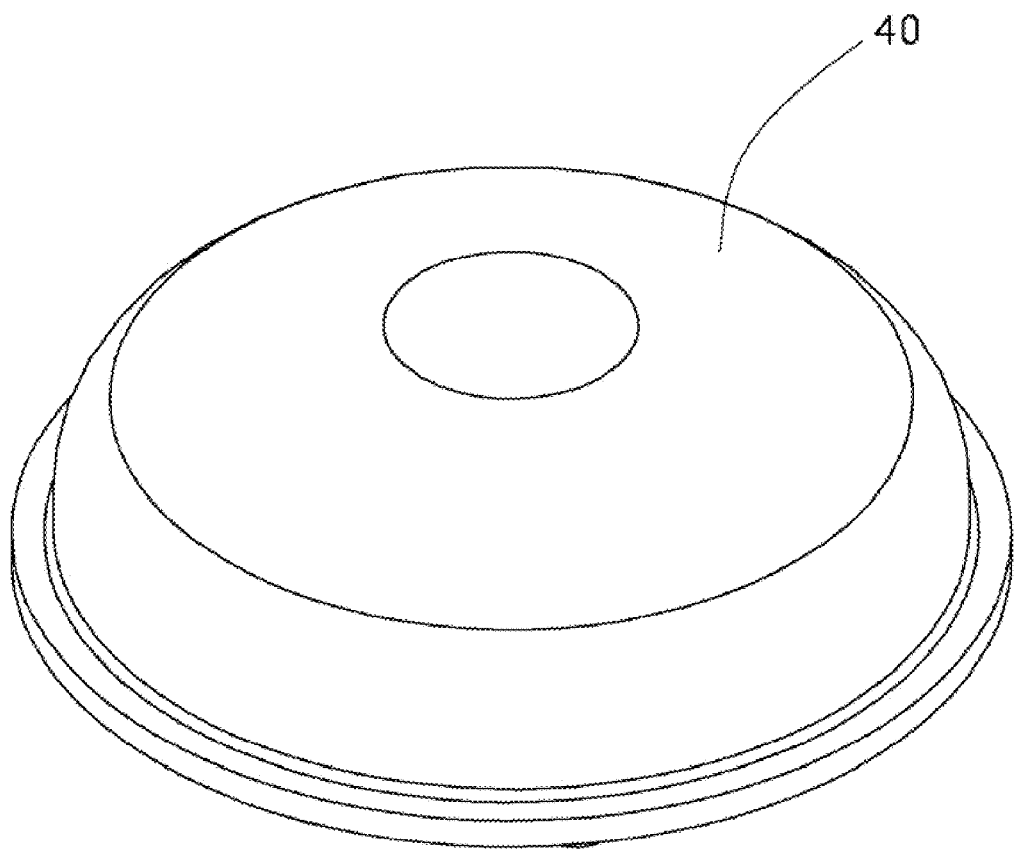
FIG. 1 is an assembled view of an LED illumination module in accordance with a first embodiment of the disclosure.
Figure 2:
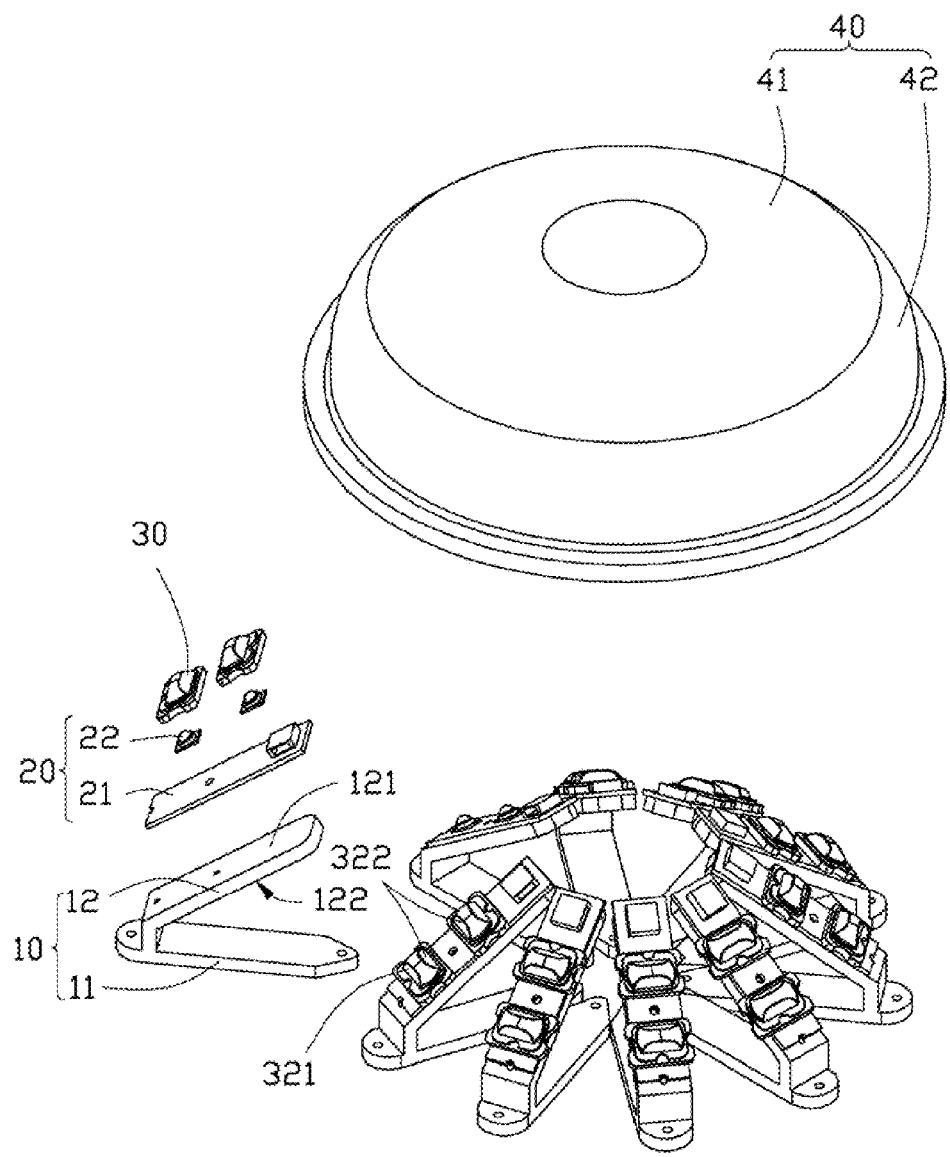
FIG. 2 is an isometric, exploded view of the LED illumination module of FIG. 1.
Figure 3:
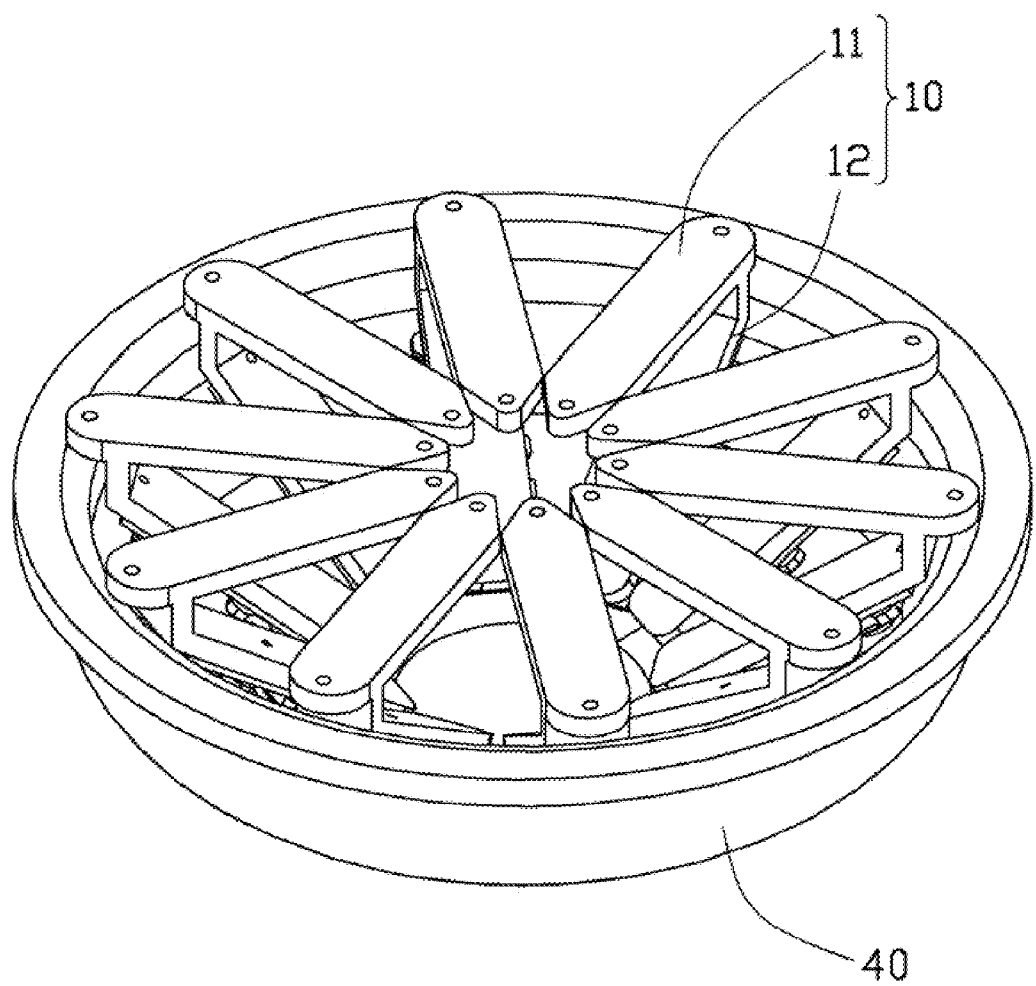
FIG. 3 is an inverted view of FIG. 1.

Referring to FIGS. 1-3, an LED illumination module includes a plurality of supporters 10, a plurality of light source modules 20, a plurality of lenses 30 and a transparent envelope 40.

Each of the supporters 10 includes a bottom plate 11 and an elongated lateral plate 12 extending slantwise from the bottom plate 11, along an upward and inward direction. When the supporters 10 are placed horizontally, the bottom plates 11 are parallel to a horizontal plane; an intersection angle of the bottom plate 11 and the lateral plate 12 can be considered as an inclined angle $\theta$ of the lateral plate 12 relative to the horizontal plane. In the present embodiment, the supporters 10 are horizontally and radially placed. In detail, the inner ends of the bottom plates 11 of the supporters 10 sequentially adjoin with each other to enclose a zone of a regular polygon; the lateral plate 12 spacingly surround the zone. Each of the lateral plates 12 of the supporters 10 includes an outer surface 121 facing away from the zone of the bottom plates 11 and an inner surface 122 facing toward the zone of the bottom plates 11. Each of the outer surfaces 121 of the lateral plates 12 has one of the light source modules 20 arranged thereon.

Each of the light source modules 20 includes an elongated printed circuit board 21 and a plurality of LEDs 22 mounted on the printed circuit board 21. The printed circuit board 21 is mounted on the outer surface 121 of the lateral plate 12, and the LEDs 22 are arranged in a line along a lengthwise direction of the corresponding lateral plate 12. Each of the LEDs 22 is covered by one of the lenses 30, whereby a light emitting angle of the LED 22 is adjusted by the corresponding lens 30 to a suitable value; therefore, this light emitting angle can be interpreted as a light emitting angle of a combination of the LED 22 and the corresponding lens 30 covering thereon, hereafter, represented by $\phi$. In the present embodiment, the combination of the LED 22 and the corresponding lens 30 is so placed on the outer surface 121 of the lateral plate 12 that an optical axis M of this LED 22 is perpendicularly to the outer surface 121. An optical axis of the lens 30 can be perpendicularly to or angled with the outer surface 121 of the lateral plate 12, according to a practical requirement.

In order to ensure that the LED illumination module of the present embodiment illuminates an area below the bottom plates 11 of the supporters 10, the inclined angle $\theta$ of the lateral plate 12 relative to the horizontal plane and the light emitting angle $\phi$ of the combination of the LED 22 and the corresponding lens 30 covering thereon should meet formula (1): $\theta+\phi>90°$, $\theta>0°$, $\phi>0°$. The light emitting angle $\phi$ can be determined by the LED 22 and the corresponding lens 30. Each of LEDs 22 itself has a constant light emitting angle, and in the present embodiment, the light emitting angle of each LED 22 is 90°. Each lens 30 has a structure to adjust the light emitting angle of the LED 22 therein. Once the LED 22 and the lens 30 are determined, the light emitting angle $\phi$ of the combination of the LED 22 and the corresponding lens 30 covering thereon can be determined; according to the formula (1), the inclined angle $\theta$ of the lateral plate 12 relative to the horizontal plane can be ascertained, whereby fixing angles of the LEDs 22 relative to the horizontal plane can be determined. According to the inclined angle $\theta$ of the lateral plate 12 relative to the horizontal plane, the supporters 10 with the light source modules 20 and the lenses 30 supported thereon can be arranged to construct a core structure of the LED illumination module.

When the lenses 30 are symmetrical structures, in order to ensure the light continuously and evenly illuminates the horizontal periphery area of the lateral plates 12 of the supporters 10, the number of the lateral plates 12 requires to be determined The light emitting angle φ of the combination of the LED 22 and the corresponding lens 30 covering thereon affects the number N of the lateral plates 12; that is, the light emitting angle φ and the number N of the lateral plates 12 should meet formula (2): N=(360°/φ)×4. Once the LED 22 and the lens 30 are determined, the number N of the lateral plates 12 can be ascertained.

Figure 4:
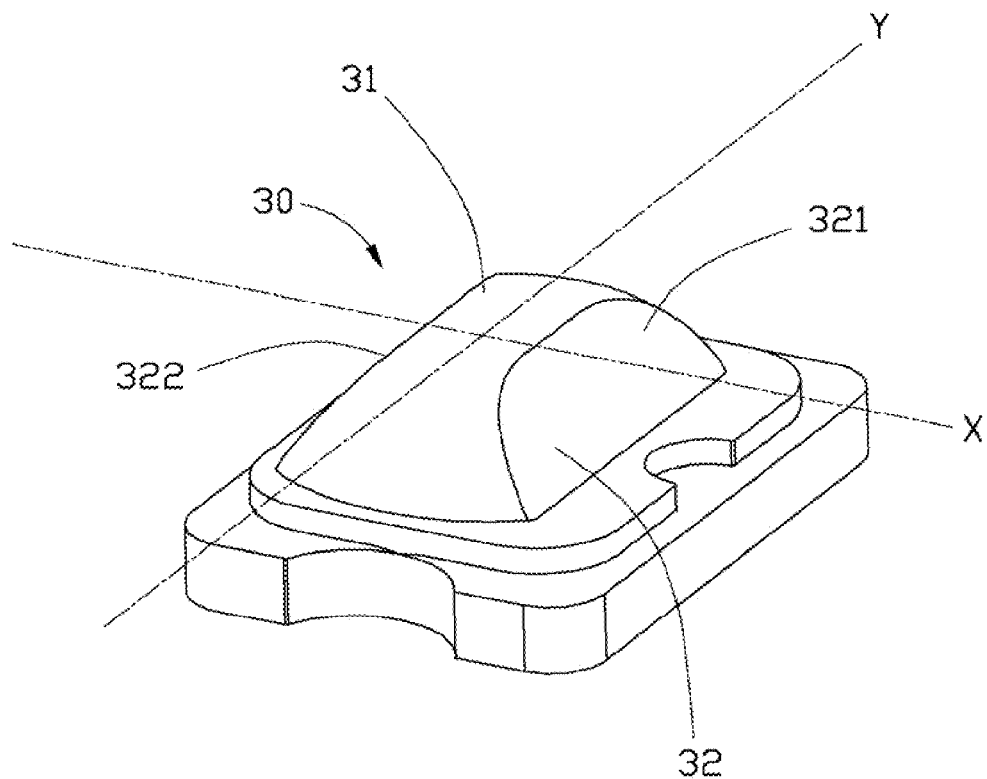
FIG. 4 is an enlarged view of a lens of the LED illumination module of FIG. 1.
Figure 5:
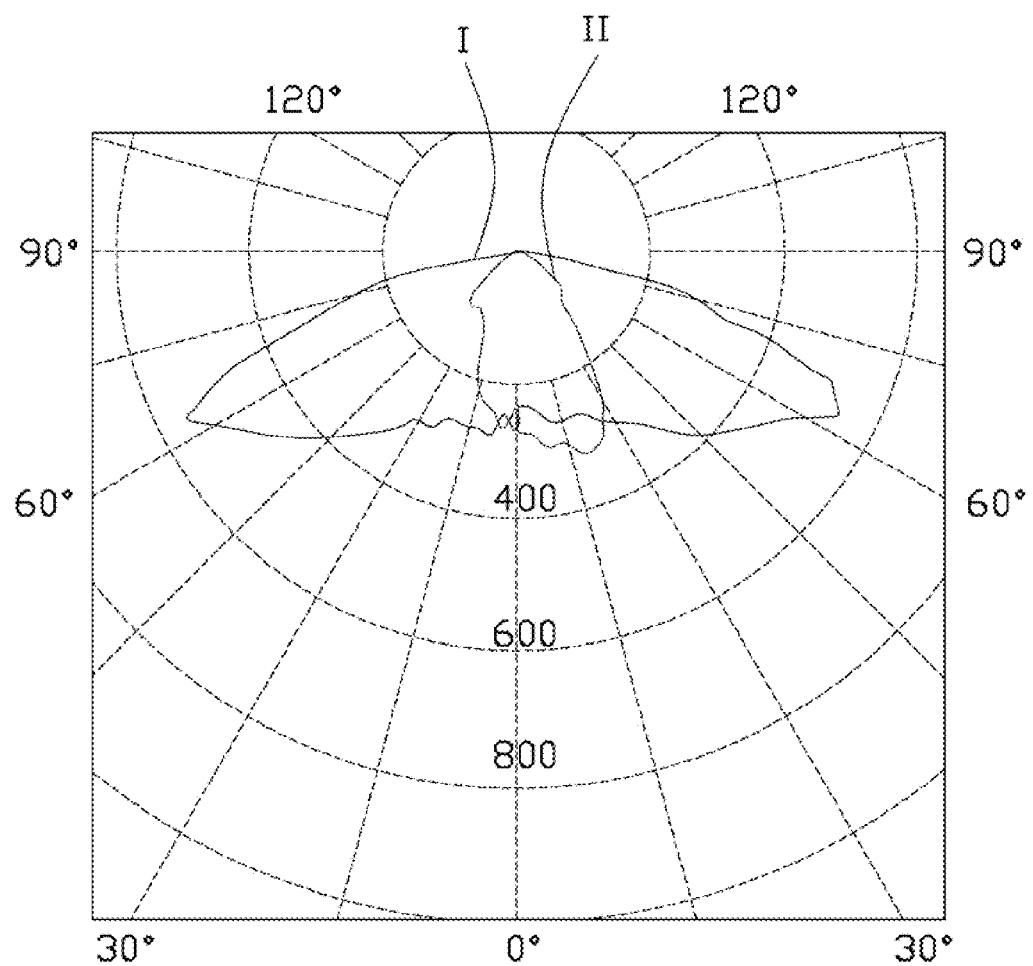
FIG. 5 is a graph showing distribution curves of luminous intensities of a light of an LED of the LED illumination module of FIG. 1 through different parts of a lens covering the LED.

In the illustrated embodiment, the lens 30 is a non-symmetrical structure and has a longitudinal light emitting surface 31 and a transversal light emitting surface 32, as shown in FIG. 4. A lengthwise extending direction of the longitudinal light emitting surface 31 is denoted by Y, a widthwise extending direction of the transversal light emitting surface 32 is denoted by X. FIG. 5 illuminates a distribution curve of luminous intensity of the combination of one LED 22 and the corresponding lens 30 covering the LED 22, which comprises two curves I and II. The curve I shows an angular distribution of luminous intensity of the light emitted from the longitudinal light emitting surface 31, which is determined by a light deflection effect of the longitudinal light emitting surface 31; the curve II shows an angular distribution of luminous intensity of the light emitted from the transversal light emitting surface 32, which is determined by a light deflection effect of the transversal light emitting surface 32. Because the lens 30 is a non-symmetrical structure, the light of the LED 22 adjusted by the corresponding lens 30 covering thereon has two light emitting angles. In detail, the light of the LED 22 adjusted by the longitudinal light emitting surface 31 of the lens 30 has a longitudinal light emitting angle α; the light of the LED 22 adjusted by the transversal light emitting surface 32 has a transversal light emitting angle β. The longitudinal light emitting angle α is larger than the transversal light emitting angle β. Due to the combination of the LED 22 and the corresponding lens 30 covering thereon having two light emitting angles α, β, there are two ways for each of the lenses 30 to be arranged on the lateral plate 12 of each of the supporters 10. The two ways are described in the following two embodiments.

Figure 6:
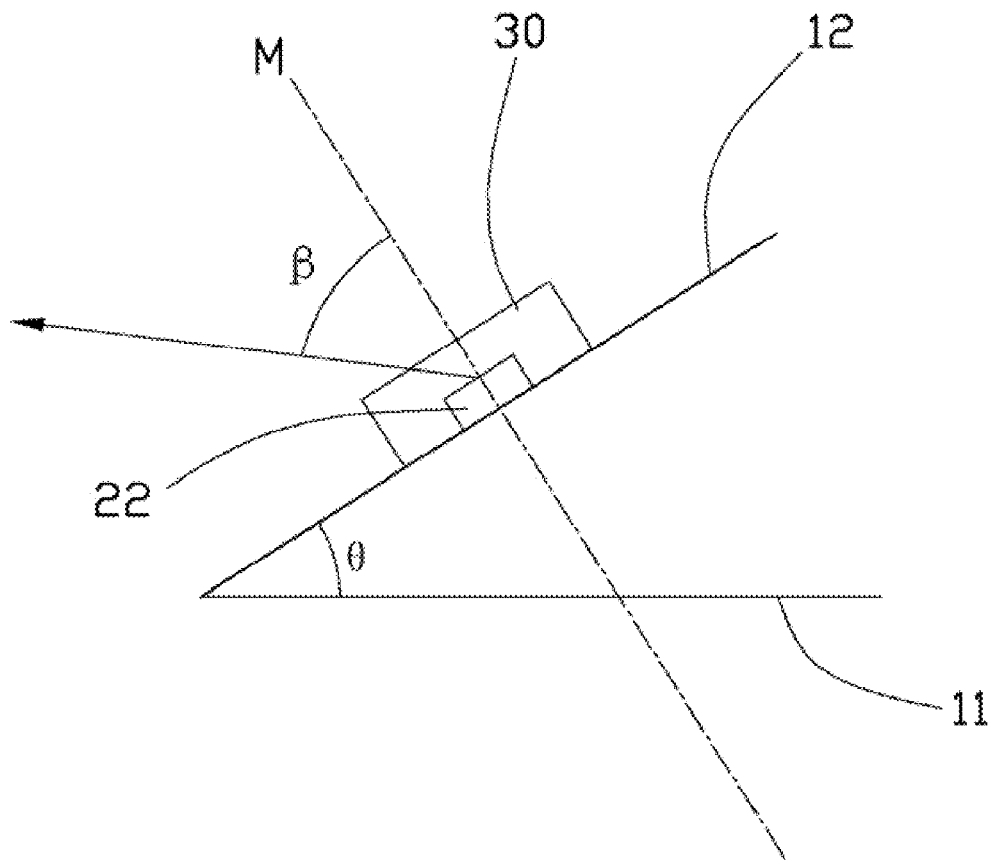
FIG. 6 is a diagrammatic view showing a relation of angle between a light of the LED through the lens covering the LED and a lateral plate of the LED illumination module of FIG. 1.

In a first embodiment, referring to FIGS. 2 and 6, the longitudinal extending direction of the longitudinal light emitting surface 31 of each of the lenses 30 is parallel to a widthwise direction of the lateral plate 12 of each of the supporters 10; the transversal extending direction of the transversal light emitting surface 32 is parallel to a lengthwise direction of the lateral plate 12 of each of the supporters 10. The light emitted from the longitudinal light emitting surface 31 of each of the lenses 30 illuminates an area extending along the widthwise direction of each of the lateral plates 12 of the supporters 10; the light emitted from the transversal light emitting surface 32 of each of the lenses 30 illuminates an area extending along the lengthwise direction of each of the lateral plates 12 of the supporters 10. Therefore, a value of the longitudinal light emitting angle α determines the light generated by the LED illumination module illuminating a horizontal periphery area of the lateral plates 12; the transversal light emitting angle β determines the light generated by the LED illumination module illuminating an area over the outer surfaces 121 of the lateral plates 12 of the supporters 10 and an area below the bottom surfaces of the bottom plates 11 of the supporters 10.

Referring to FIG. 6, the transversal light emitting angle β is a deflection angle of the light relative to the optical axis M of the LED 22. The transversal light emitting angle β is considered as φ of the above-described formula (1), thus, θ+β>90°. That is, a combination of the transversal light emitting angle β of the LED 22 adjusted by the transversal light emitting surface 32 of the lens 30 covering the LED 22 and the inclined angle θ of the lateral plate 12 relative to the horizontal plane ensures the light emitted from the transversal light emitting surface 32 of the lens 30 to illuminate the area below the bottom plates 11 of the supporters 10 and the area over the lateral plates 12 of the supporters 10.

In order to ensure the light continuously and evenly illuminates the horizontal periphery area of the lateral plates 12 of the supporters 10, the number of the lateral plates 12 requires to be determined. The longitudinal light emitting angle α affects the number N of the lateral plates 12; that is, the longitudinal light emitting angle α and the number N of the lateral plates 12 meet formula (2): N=(360°/α)×4. Once the LED 22 and the lens 30 are determined, the number N of the lateral plates 12 can be ascertained.

Referring to the curve II of FIG. 5, the transversal light emitting surface 32 is a non-symmetrical structure relative to the longitudinal light emitting surface 31. As shown in FIG. 4, the transversal light emitting surface 32 includes a first portion 321 and a second portion 322. The first and second portions 321, 322 are connected on two opposite sides of the longitudinal light emitting surface 31, respectively. The light emitting angle (or called deflection angle) of the LED 22 adjusted by the second portion 322 is larger than that adjusted by the first portion 321. In the above-described first embodiment, the transversal light emitting angle β of the LED 22 adjusted by the transversal light emitting surface 32 is considered as the light emitting angle (or called deflection angle) of the LED 22 adjusted by the second portion 322 of the transversal light emitting surface 32. In the first embodiment, the outer surface 121 of the lateral plate 12 of each of the supporters 10 has two LEDs 22 arranged thereon, in which two lenses 30 cover the two LEDs 22, respectively. The second portions 322 of the two lenses 30 face a same direction or are oriented towards opposite directions. For example, in FIG. 2, the second portions 322 of the two lenses 30 are oriented towards opposite directions, i.e., one second portion 322 of one lens 30 facing a top end of the lateral plate 12, the other second portion 322 of one lens 30 facing a bottom end of the lateral plate 12.

Figure 7:
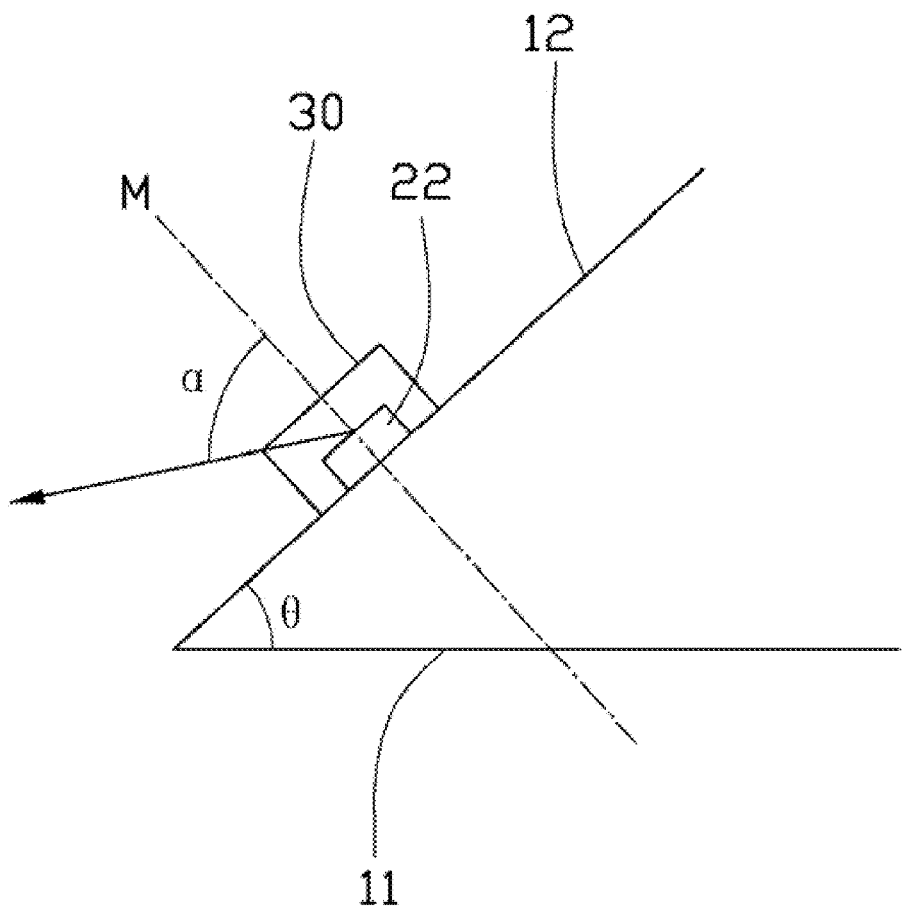
FIG. 7 is a view similar to FIG. 6, showing a relation between an LED covered by a lens and a lateral plate of an LED illumination module in accordance with a second embodiment of the disclosure.

In a second embodiment, the transversal extending direction of the transversal light emitting surface 32 of each of the lenses 30 is parallel to a widthwise direction of the lateral plate 12 of each of the supporters 10; the longitudinal extending direction of the longitudinal light emitting surface 31 is parallel to a longwise direction of the lateral plate 12 of each of the supporters 10. Referring to FIG. 7, the longitudinal light emitting angle α is a deflection angle of the light relative to the optical axis M of the LED 22. The longitudinal light emitting angle α is considered as φ of the above-described formula (1), thus, θ+α>90°. That is, a combination of the longitudinal light emitting angle α of the LED 22 adjusted by the longitudinal light emitting surface 31 of the lens 30 covering the LED 22 and the inclined angle θ of the lateral plate 12 relative to the horizontal plane ensures the light emitted from the longitudinal light emitting surface 31 of the lens 30 to illuminate the area below the bottom plates 11 of the supporters 10 and the area over the lateral plates 12 of the supporters 10.

In order to ensure that the light continuously and evenly illuminates the horizontal periphery area of the lateral plates 12 of the supporters 10, the number of the lateral plates 12 requires to be determined The value of the transversal light emitting angle β effects the number N of the lateral plates 12;

that is, the transversal light emitting angle β and the number N of the lateral plates 12 meet formula (2): N=(360°/β)×4. Once the LED 22 and the lens 30 are determined, the number N of the lateral plates 12 can be ascertained.

The envelope 40 includes a main part 41 and a periphery part 42 extending downwardly from a circumferential edge of the main part 41 to form an enclosed arc-shaped configuration. The envelope 40 covers the supporters 10, the light source modules 20 and the lenses 30 therein. The envelope 40 can be made of glass, polycarbonate, polymethyl methacrylate or other suitable material. The envelope 40 can be treated to be a frosted structure or transparent structure to achieve a required light illuminating effect. The envelope 40 can be frosted by sandblasting thereof, doping diffuse particles therein or pasting a diffuse film thereon. Preferably, an inner surface of the envelope 40 is processed by the sandblasting process or is pasted a diffuse filmed. The diffuse particles is doped in a raw material such as the polycarbonate, and the raw material containing the diffuse particles undergoes an injection molding process to get the envelope 40 having the diffuse particles doped therein.

Figure 8:
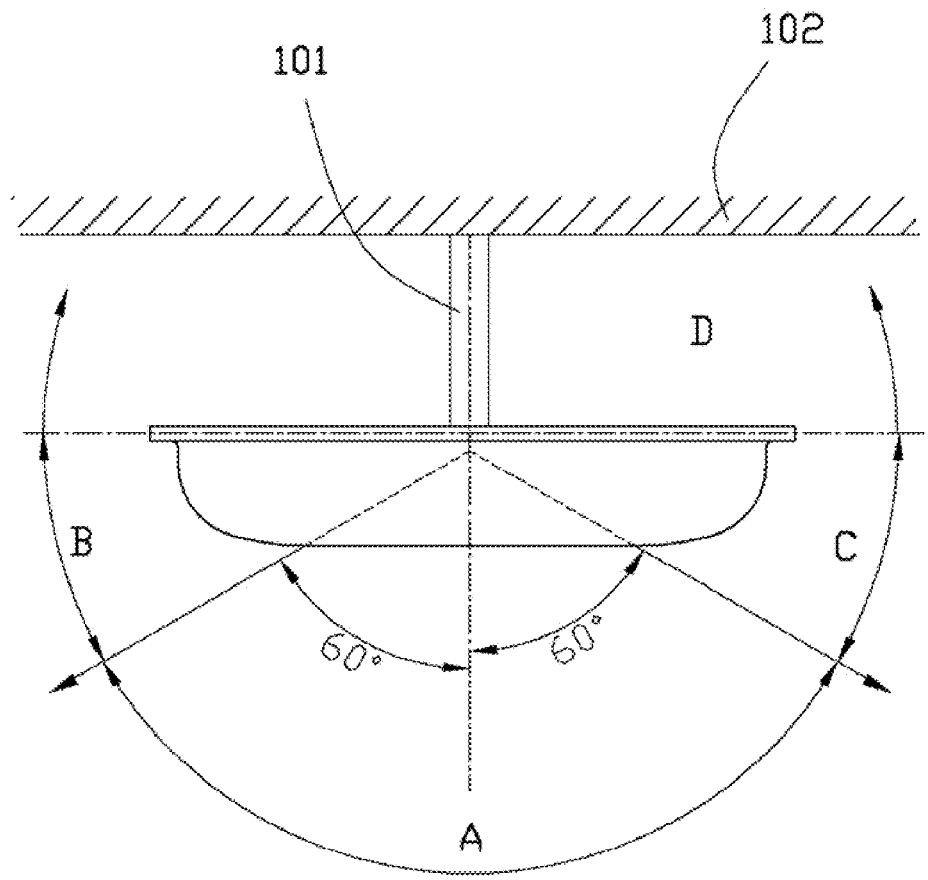
FIG. 8 is an illustrative view showing an angular distribution of the light generated by the LED lighting module of FIG. 1.
Figure 9:
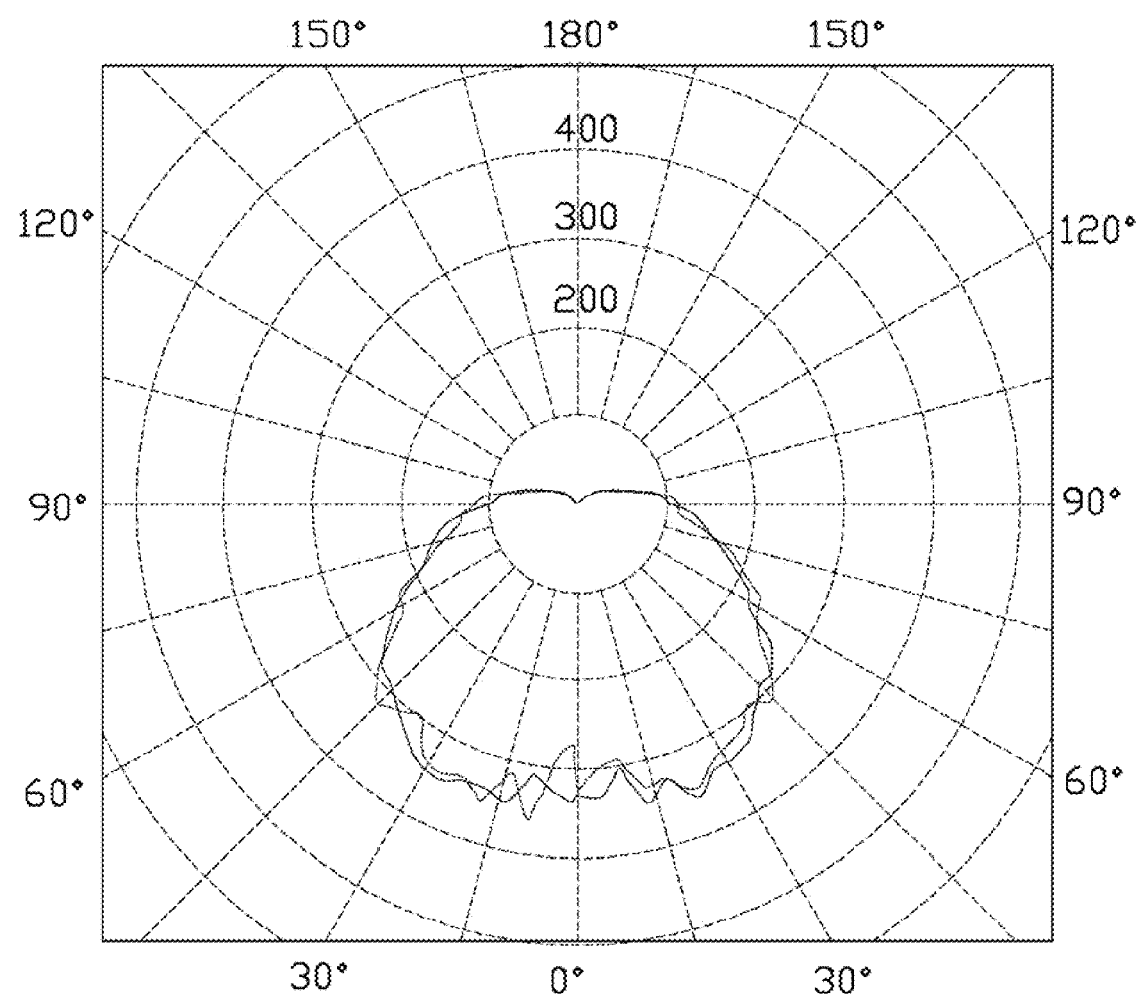
FIG. 9 is graph showing a distribution curve of luminous intensity of the LED illumination module of FIG. 1.

The above-described LED illumination module can be cooperated with other structures to form various illumination devices. For example, the LED illumination module is secured to a ceiling 102 by a suspension post 101, as shown in FIG. 8. Referring to FIGS. 8-9, the LED illumination module has three illumination regions, i.e., a main working area (the space over the lateral plates 12 of the supporters 10), a glare area where the glare easily occurs and the periphery working area (the space below the bottom plates 11 of the supporters 10). In detail, in the main working area, the light emitting angle of the LED illumination module ranges from 0° to about 120°; the light has a high luminous intensity to thereby meet a practical illumination requirement. In the glare area, the light emitting angle of the LED illumination module ranges from about 120° to about 180°; the light has a low luminous intensity to thereby weaken the glare intensity of the whole LED illumination module. In the periphery area, the light emitting angle of the LED illumination module ranges larger than 180°, and even reaches 210°; the light generated by the LED illumination module has a certain luminous intensity. In sum, the LED illumination module can illuminate both of the main working area and the periphery working area, thereby acquiring a large light emitting angle which is larger than 180° (and less than 360°).

The supporters 10 can be heat conducting structures to ensure the LEDs 22 to work stably. The supporters 10 can be an integral structure having a number of lateral plates 12. For example, the bottom plates 11 are integrated into a unitary bottom plate, the lateral plates 12 protrude upwardly and inwardly from a circumference of the unitary bottom plate.

It is to be understood, however, that even though numerous characteristics and advantages of the present embodiments have been set forth in the foregoing description, together with details of the apparatus and function of the embodiments, the disclosure is illustrative only, and changes may be made in detail, especially in matters of shape, size, and arrangement of parts within the principles of the embodiments to the full extent indicated by the broad general meaning of the terms in which the appended claims are expressed.

The invention claimed is:

1. An LED illumination module comprising:
   A plurality of supporters each comprising a bottom plate and a lateral plate extending upwardly and slantwise from the bottom plate;
   an LED mounted on an outer surface of the lateral plate of each of the supporters; and
   a lens covering the LED;
   wherein an inclined angle θ of the lateral plate relative to the bottom plate and a light emitting angle φ of the LED adjusted by the lens covering thereon meet a formula: θ+φ>90°.

2. The LED illumination module claim 1, wherein the supporters are horizontally and radially placed.

3. The LED illumination module of claim 2, wherein inner ends of the bottom plates of the supporters sequentially adjoin with each other to enclose a zone of a regular polygon, and the lateral plates of the supporters spacingly surround the zone.

4. The LED illumination module of claim 1, wherein the lens is a symmetrical structure; the light emitting angle φ of the LED adjusted by the lens covering thereon and the number N of the lateral plates of the supporters meet a formula: N=(360°/φ)×4.

5. The LED illumination module of claim 1, wherein the lens is a non-symmetrical structure and comprises a longitudinal light emitting surface and a transversal light emitting surface, and a longitudinal light emitting angle α of the LED adjusted by the longitudinal light emitting surface of the lens is larger a transversal light emitting angle β of the LED adjusted by the transversal light emitting surface.

6. The LED illumination module of claim 5, wherein a longitudinal extending direction of the longitudinal light emitting surface of the lens is parallel to a widthwise direction of the lateral plate of each of the supporters, and a transversal extending direction of the transversal light emitting surface is parallel to a lengthwise direction of the lateral plate of each of the supporters, the transversal light emitting angle β being considered as the light emitting angle φ, the transversal light emitting angle β and the inclined angle θ of the lateral plate relative to the bottom plate meeting a formula: θ+β>90°.

7. The LED illumination module of claim 6, wherein the longitudinal light emitting angle α of the LED adjusted by the longitudinal light emitting surface of the lens and the number N of the lateral plates of the supporters meet a formula: N=(360°/α)×4.

8. The LED illumination module of claim 5, wherein a transversal extending direction of the transversal light emitting surface of the lens is parallel to a widthwise direction of the lateral plate of each of the supporters, and a longitudinal extending direction of the longitudinal light emitting surface is parallel to a lengthwise direction of the lateral plate of each of the supporters, the longitudinal light emitting angle α being considered as the light emitting angle φ, the longitudinal light emitting angle α and the inclined angle θ of the lateral plate relative to the bottom plate meeting a formula: θ+α>90°.

9. The LED illumination module of claim 8, wherein the transversal light emitting angle β of the LED adjusted by the transversal light emitting surface of the lens and the number N of the lateral plates of the supporters meet a formula: N=(360°/β)×4.

10. The LED illumination module of claim 1, further comprising an envelope covering the supporters, the LED and the lens therein, and the envelope comprises a main part and a periphery part extending downwardly from a circumferential edge of the main part.

11. The LED illumination module of claim 10, wherein the envelope is one of a frosted structure and a transparent structure.

12. An LED illumination module comprising:
   A horizontal bottom plate and a plurality of lateral plates extending upwardly and slantwise from the bottom plate;

a plurality of LEDs mounted on an outer surface of each of the lateral plates; and a lens covering each of the LEDs;

wherein an inclined angle $\theta$ of each of the lateral plates relative to the bottom plate and a light emitting angle $\phi$ of one of the LEDs adjusted by the lens covering thereon meet a formula: $\theta+\phi>90°$.

13. The LED illumination module claim 12, wherein the lateral plates are radially placed.

14. The LED illumination module of claim 13, wherein the lens is a symmetrical structure, and the light emitting angle $\phi$ of the LED adjusted by the lens covering thereon and the number N of the lateral plates meet a formula: $N=(360°/\phi)\times 4$.

15. The LED illumination module of claim 12, wherein the lens is a non-symmetrical structure and comprises a longitudinal light emitting surface and a transversal light emitting surface, and a longitudinal light emitting angle $\alpha$ of the LED adjusted by the longitudinal light emitting surface of the lens is larger a transversal light emitting angle $\beta$ of the LED adjusted by the transversal light emitting surface.

16. The LED illumination module of claim 15, wherein a longitudinal extending direction of the longitudinal light emitting surface of the lens is parallel to a widthwise direction of each of the lateral plates, and a transversal extending direction of the transversal light emitting surface is parallel to a lengthwise direction of each of the lateral plates, the transversal light emitting angle $\beta$ being considered as the light emitting angle $\phi$, the transversal light emitting angle $\beta$ and the inclined angle $\theta$ of the lateral plate relative to the bottom plate meeting a formula: $\theta+\beta>90°$.

17. The LED illumination module of claim 16, wherein the longitudinal light emitting angle $\alpha$ of the LED adjusted by the longitudinal light emitting surface of the lens and the number N of the lateral plates of the supporters meet a formula: $N=(360°/\alpha)\times 4$.

18. The LED illumination module of claim 15, wherein a transversal extending direction of the transversal light emitting surface of the lens is parallel to a widthwise direction of each of the lateral plates, and a longitudinal extending direction of the longitudinal light emitting surface is parallel to a lengthwise direction of each of the lateral plates of the supporters, the longitudinal light emitting angle $\alpha$ being considered as the light emitting angle $\phi$, the longitudinal light emitting angle $\alpha$ and the inclined angle $\theta$ of the lateral plate relative to the bottom plate meeting a formula: $\theta+\alpha>90°$.

19. The LED illumination module of claim 18, wherein the transversal light emitting angle $\beta$ of the LED adjusted by the transversal light emitting surface of the lens and the number N of the lateral plates of the supporters meet a formula: $N=(360°/\beta)\times 4$.

* * * * *